(12) United States Patent
Hunter et al.

(10) Patent No.: US 8,983,687 B1
(45) Date of Patent: Mar. 17, 2015

(54) WIND SHEAR SAFETY PERFORMANCE TOOL

(75) Inventors: Stephan G. Hunter, Seattle, WA (US); Steven James Churchill, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 284 days.

(21) Appl. No.: 13/419,210

(22) Filed: Mar. 13, 2012

Related U.S. Application Data

(60) Provisional application No. 61/515,659, filed on Aug. 5, 2011.

(51) Int. Cl.
- *G08G 5/00* (2006.01)
- *G08B 23/00* (2006.01)
- *G05D 1/06* (2006.01)
- *B64D 45/00* (2006.01)
- *G05D 1/04* (2006.01)

(52) U.S. Cl.
CPC ............ *G08G 5/0056* (2013.01); *G05D 1/0638* (2013.01); *B64D 2045/0075* (2013.01); *G08G 5/0091* (2013.01); *G05D 1/046* (2013.01); *G05D 1/0615* (2013.01)
USPC .................. 701/14; 340/968; 701/15; 701/16

(58) Field of Classification Search
CPC ... G08G 5/0056; G08G 5/0091; G05D 1/101; G05D 1/046; G05D 1/0615; G05D 1/0638; G05D 1/0653; G05D 1/0661; G05D 1/0676; B64D 2045/0075
USPC .................................. 701/15, 16, 14; 340/968
See application file for complete search history.

(56) References Cited

U.S. PATENT DOCUMENTS

| | | | |
|---|---|---|---|
| 2005/0143871 A1* | 6/2005 | Boorman et al. | 701/3 |
| 2007/0198143 A1* | 8/2007 | Ybarra et al. | 701/9 |

OTHER PUBLICATIONS

Airbus, Flight Operations Briefing Notes: Adverse Weather Operations—Windshear Awareness, Oct. 2007.*
Stratton et al., Real-Time Decision Aiding: Aircraft Guidance for Wind Shear Avoidance, Jan. 1995, IEEE Transactions on Aerospace and Electronic Systems, vol. 31, No. 1.*
"Onboard Performance Tool," The Boeing Electronic Flight Bag, Boeing Commercial Airplanes, copyright 2010, 2 pages, accessed Mar. 9, 2012 http://www.boeing.com/commercial/aviationservices/brochures/opt.pdf.
"Guidelines for Operational Approval of Windshear Training Programs," Advisory Circular, Federal Aviation Administration, U.S. Department of Transportation, AC. No. 120-50A, Feb. 1996, 12 Pages.

* cited by examiner

*Primary Examiner* — John Q Nguyen
*Assistant Examiner* — Nadeem Odeh
(74) *Attorney, Agent, or Firm* — Yee & Associates, P.C.

(57) ABSTRACT

A system and method for identifying a recommended configuration for operating an aircraft in wind shear conditions. A processor unit receives information associated with an operation to be performed by the aircraft. The processor unit receives an indication that wind shear may be present during the operation. Responsive to receiving the indication that the wind shear may be present during the operation, the processor unit identifies the recommended configuration for the aircraft to perform the operation using the information associated with the operation to be performed by the aircraft and rules for operating the aircraft in the wind shear conditions.

20 Claims, 7 Drawing Sheets

FIG. 4

WINDSHEAR PRECAUTIONS

-Computed performance based on maximum takeoff thrust (TO)
-Use longest suitable runway clear of known windshear
-Consider using flaps 20 unless performance requires a lower flap setting
-If windshear is encountered at or above normal VR, do not attempt to accelerate to increased VR. Rotate immediately at a normal rate toward a 15 degree pitch altitude
-If windshear is encountered or above normal VR, do not attempt to accelerate to increased VR. Rotate normally to engine out pitch altitude
-If there is insufficient runway left to stop, initiate a normal rotation at least 2000 feet before the end of the runway even if the airspeed is low

[ OK ]

*sample text only*

FIG. 5

| FLAP | ACCELHT | |
|---|---|---|
| 20 | 1240 ft MSL | V1 146 KT |
| | | VR 150 KT |
| RWY / INTX | | 167 KT |
| 16L | | V2 161 KT |
| | | |
| TOGW | TO | |
| 625000 LB | 105.8 | Vref30 159 KT |

Engine Failure Procedure: ** NO EMERGENCY TURN
*** APR-JUN 2011

WIND SHEAR SAFETY PERFORMANCE TOOL

RELATED PROVISIONAL APPLICATION

This application claims the benefit of U.S. Provisional Patent Application No. 61/515,659, entitled "Windshear Safety Performance Tool" filed Aug. 5, 2011, which is incorporated herein by reference.

BACKGROUND INFORMATION

1. Field

The present disclosure relates generally to a system and method for determining an appropriate configuration for operation of an aircraft. Still more particularly, the present disclosure relates to a system and method for determining an appropriate configuration for operating an aircraft in wind shear conditions.

2. Background

Wind shear is a difference in wind speed and direction over a relatively short distance in the atmosphere. Wind shear may include vertical and horizontal components. Horizontal wind shear typically occurs across fronts and near the coast. Vertical wind shear typically occurs near the surface of the Earth. Vertical wind shear also may occur at higher levels in the atmosphere.

Wind shear may affect the control of aircraft during various aircraft operations. For example, wind shear at low levels in the atmosphere may affect the airspeed of aircraft during takeoff and landing. Wind shear has been a sole or contributing cause of many aircraft accidents.

The threat to safe operation of aircraft that may be posed by wind shear may be reduced by appropriate training of aircraft flight crew. For example, pilots may be trained to identify and respond to wind shear in an appropriate manner when wind shear is encountered during operation of an aircraft.

In 1985, the Federal Aviation Administration of the U.S. Department of Transportation contracted with a consortium of aviation specialists to produce a wind shear training aid to enhance the understanding of wind shear by a pilot. The resulting wind shear training aid included information that was presented in various media formats and that was designed to provide effective training for flight crews in order to minimize the wind shear threat. The consortium of aviation specialists who developed this uniform, industry-wide training aid focused on the causes and effects of wind shear and developed instructions for wind shear identification, avoidance, and recovery. This information provides an operator of aircraft with data to create or update its own wind shear training program.

The potential dangers to safe operation of an aircraft associated with wind shear also may be reduced if the pilot of the aircraft is aware of the presence of wind shear in the area of aircraft operations. Aircraft may be equipped with on-board wind shear detection equipment for notifying the pilot when wind shear conditions are detected in the area of aircraft operations. Off-board equipment and systems also may be used to detect wind shear conditions in the area of aircraft operations. In this case, the detection of wind shear conditions in areas that may affect aircraft operations may be reported to the pilot onboard an aircraft by off-board personnel or automated equipment.

If a pilot is aware of the presence of wind shear in an area of aircraft operations, the pilot may operate the aircraft in a manner that reduces or eliminates the risk to aircraft operation that may be posed by the wind shear. In this case, the pilot may operate the aircraft in the presence of wind shear in a manner that is different from the way in which the pilot would operate the aircraft if wind shear were not present.

A pilot may remember techniques for operating an aircraft to mitigate the effects of wind shear that were learned by the pilot during training. The pilot may access printed or other resources to look up information related to aircraft operation in the presence of wind shear to help recall or supplement the information that was provided in training. The pilot may perform various calculations to determine an appropriate manner for operating the aircraft in the presence of wind shear that takes into account various other conditions for aircraft operation. For example, these various other conditions may include air traffic control procedures at an airport, current environmental conditions, aircraft performance limitations, policies imposed by an aircraft operator, or other conditions or combinations of conditions. Relying on memory, looking up information, and performing manual calculations to determine the appropriate way to operate an aircraft in the presence of wind shear may be subject to various undesired limitations.

Accordingly, it would be beneficial to have a method and apparatus that takes into account one or more of the issues discussed above as well as possibly other issues.

SUMMARY

It should be appreciated that this summary is provided to introduce selected aspects of the disclosure in a simplified form that are further described below in the detailed description. This summary is not intended to be used to limit the scope of the claimed subject matter. Other aspects and features of the present disclosure, as defined solely by the claims, will become apparent to those ordinarily skilled in the art upon review of the following non-limited detailed description of the disclosure in conjunction with the accompanying figures.

An embodiment of the present disclosure provides a method for identifying a recommended configuration for operating an aircraft in wind shear conditions. A processor unit receives information associated with an operation to be performed by the aircraft. The processor unit also receives an indication that wind shear may be present during the operation. Responsive to receiving the indication that wind shear may be present during the operation, the processor unit identifies a recommended configuration for the aircraft to perform the operation using the information associated with the operation to be performed by the aircraft and rules for operating the aircraft in wind shear conditions.

Another embodiment of the present disclosure provides an apparatus comprising a configuration identifier. The configuration identifier is configured to receive information associated with an operation to be performed by an aircraft and an indication that wind shear may be present during the operation. The configuration identifier is also configured to identify, responsive to receiving the indication that wind shear may be present during the operation, a recommended configuration for the aircraft to perform the operation using the information associated with the operation to be performed by the aircraft and rules for operating the aircraft in wind shear conditions.

Another embodiment of the present disclosure provides a method for identifying a recommended configuration for operating an aircraft in wind shear conditions. Rules for operating the aircraft in wind shear conditions are stored in a storage device. A data processing system is configured to receive information associated with an operation to be performed by the aircraft and an indication that wind shear may be present during the operation. The data processing system is also configured, responsive to receiving the indication that wind shear may be present during the operation, to retrieve the rules for operating the aircraft in wind shear conditions from the storage device and to identify a recommended configuration for the aircraft to perform the operation using the information associated with the operation to be performed by the aircraft and the rules for operating the aircraft in wind shear conditions.

The features, functions, and benefits of illustrative embodiments can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof will best be understood by reference to the following detailed description of illustrative embodiments of the present disclosure when read in conjunction with the accompanying drawings, wherein:

FIG. 4 is an illustration of a presentation of guidance information for wind shear in accordance with an illustrative embodiment;

FIG. 5 is an illustration of a presentation of a recommended takeoff configuration for an aircraft when wind shear is indicated in accordance with an illustrative embodiment;

DETAILED DESCRIPTION

Figure 1:
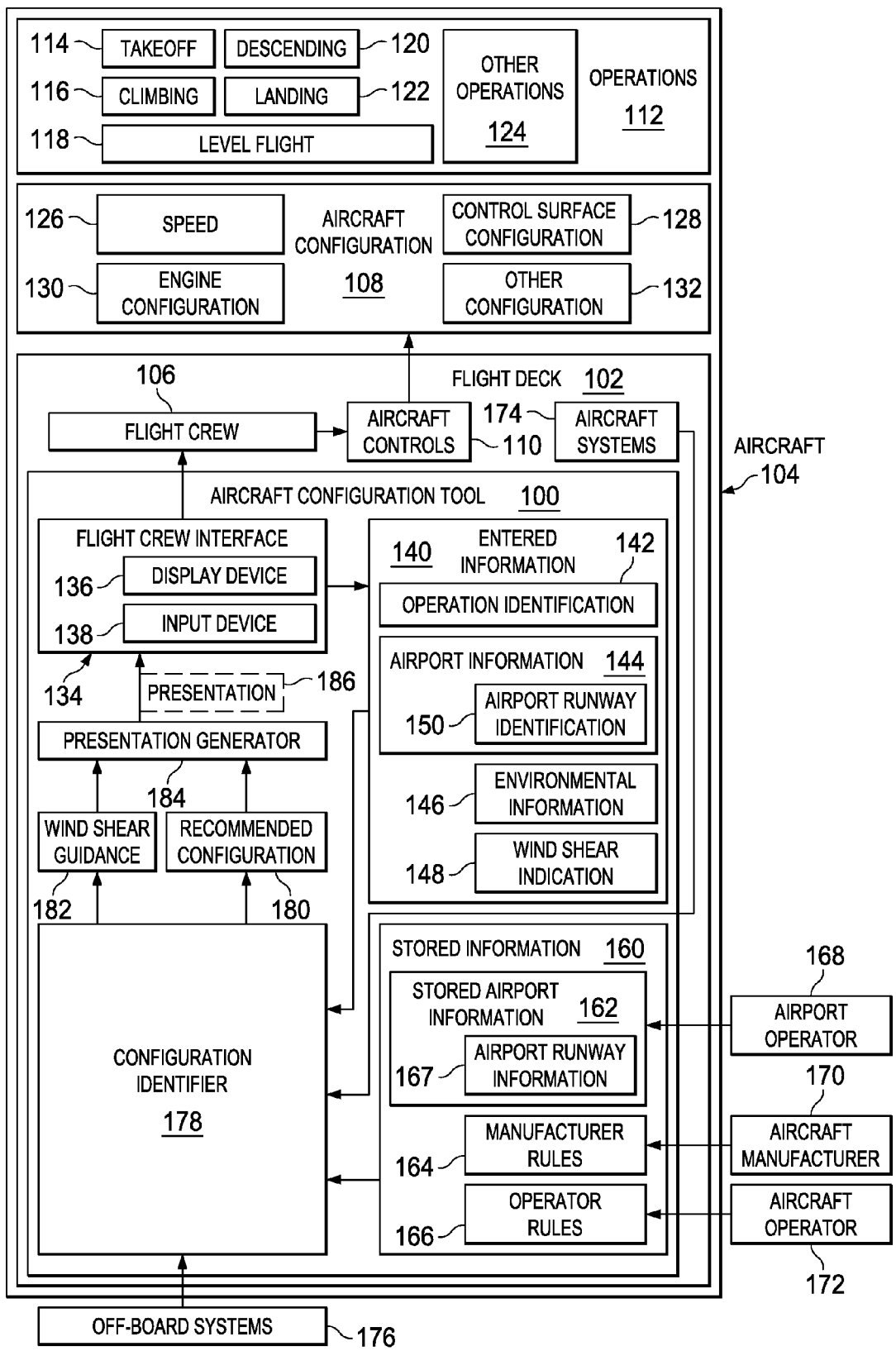
FIG. 1 is an illustration of a block diagram of an aircraft configuration tool in accordance with an illustrative embodiment.

The following disclosure describes systems, methods, and apparatuses for a wind shear safety performance tool. Certain specific details are set forth in the following description and the figures to provide a thorough understanding of the various embodiments of the disclosure. Well-known structures, systems, and methods often associated with aircraft navigation, communication, control, display, and flight management systems have not been shown or described to avoid unnecessarily obscuring the description of the various embodiments of the disclosure. In addition, those of ordinary skill in the relevant art will understand that additional embodiments of the present disclosure may be practiced without several of the details described below.

Embodiments of the disclosure described below may take the form of computer-executable instructions, such as routines executed by a programmable computer. Those skilled in the relevant art will appreciate that illustrative embodiments may be practiced on other data processing system configurations as well. For example, the disclosure may be embodied in a special-purpose computer or data processor that is specifically programmed, configured, or constructed to perform one or more of the computer-executable functions described below. Accordingly, the terms "computer" and "data processing system" as generally used herein refer to any data processor that may be engaged in a flight deck of an aircraft, including Electronic Flight Bags (EFB), cockpit display systems, Flight Management Computers (FMC), Flight Control Computers (FCC), laptops, tablet computers, or hand-held devices.

The disclosure may also be practiced in distributed computing environments in which tasks or modules are performed via remote processing devices that are linked through a communication network, such as those enabled via datalink by aircraft communication systems. In a distributed computing environment, program modules or subroutines may be located in both local and remote memory storage devices. Aspects of the disclosure described below may be stored or distributed on computer-readable media, including magnetic or optically readable computer disks, including removable disks, as well as distributed electronically over networks, such networks including ground-based and satellite-based components of navigation systems. Data structures and transmission of data particular to aspects of the disclosure are also encompassed within the scope of the disclosure. Information handled in accordance with aspects of the disclosure may be presented on displays or display media, such as, for example, cathode ray tube (CRT) screens, liquid crystal display (LCD) screens, head-up displays, touch screens, or other suitable display devices.

The different illustrative embodiments recognize and take into account a number of different considerations. "A number", as used herein with reference to items, means one or more items. For example, "a number of different considerations" means one or more different considerations.

The different illustrative embodiments recognize and take into account that a pilot or another member of the flight crew on an aircraft may operate an aircraft in the presence of wind shear differently from the way in which the aircraft would be operated in the absence of wind shear. Furthermore, it is desirable that an aircraft is operated in the presence of wind shear in a manner that reduces or eliminates the potential risks associated with operating the aircraft in the presence of wind shear and that satisfies other conditions for aircraft operation. For example, without limitation, various other conditions for operating the aircraft may include air traffic control procedures at an airport, current environmental conditions, aircraft performance limitations, policies imposed by an aircraft operator, or other requirements or combinations of requirements.

The different illustrative embodiments recognize and take into account that a pilot or other flight crew member may remember techniques for operating an aircraft to mitigate the effects of wind shear that were learned during training. The pilot or another flight crew member may access printed or other resources to look up information related to aircraft operation in the presence of wind shear to help recall or supplement the information that was provided in training. The pilot or another flight crew member also may perform various calculations to determine an appropriate manner for operating the aircraft in the presence of wind shear that also takes into account the various other conditions for aircraft operation.

The different illustrative embodiments also recognize and take into account that relying on memory, looking up information, performing manual calculations, and other current methods for determining the appropriate way to operate an aircraft in the presence of wind shear may be subject to various undesired limitations. For example, current methods may be relatively complicated, time consuming, or both. Furthermore, current methods may be subject to accuracy limitations. Such accuracy limitations may require that such methods be repeated or that the results of such methods be checked to verify that an identified manner for operating an aircraft in the presence of wind shear is accurate. The requirement to repeat such methods or to check the results of such methods further adds to the time required to identify a desired manner in which to operate an aircraft in the presence of wind shear using such current methods.

The different illustrative embodiments recognize and take into account that identifying an appropriate manner for operating an aircraft may include identifying an appropriate aircraft configuration. The aircraft configuration may be defined by various aircraft operating parameters, the configuration of various aircraft systems, or both. For example, without limitation, an aircraft configuration for operating an aircraft may include the speed of the aircraft, the configuration of various aerodynamic control surfaces of the aircraft, the configuration of the operation of the aircraft engines, other operating parameters, the configuration of other aircraft systems, or combinations of operating parameters and configurations of aircraft systems for operation of the aircraft in a desired manner.

The different illustrative embodiments recognize and take into account that on-board electronic tools may be available to assist an aircraft flight crew to identify an appropriate aircraft configuration for operation of an aircraft. For example, such electronic tools may provide computer implemented information and functions on an aircraft flight deck or at another location that permits flight crews and ground personnel to perform calculations based on aircraft operating conditions, such as current weather and runway conditions, while adhering to operator and regulatory policies and procedures. Such a tool may provide a planning capability that allows flight crews to calculate a takeoff analysis, a landing analysis, and weight and balance information to identify a desired aircraft configuration. However, the different illustrative embodiments recognize and take into account that no such tools provide any assistance for identifying a desired configuration for operating an aircraft in the presence of wind shear conditions.

Therefore, illustrative embodiments provide methods, systems, and apparatuses that address the aforementioned challenges and that enable a flight crew to identify and utilize an aircraft configuration that is suited to operation of the aircraft in wind shear conditions. Systems, methods, and apparatuses in accordance with the illustrative embodiments provide flight crews with customized guidance information for takeoffs and other aircraft operations where wind shear may occur. Illustrative embodiments provide an onboard wind shear safety performance tool that is configurable by an entity, such as an airline operator, such that the customized guidance information is consistent with operational practices for wind shear conditions.

Turning now to FIG. 1, an illustration of a block diagram of an aircraft configuration tool is depicted in accordance with an illustrative embodiment. In this example, aircraft configuration tool 100 may be implemented on flight deck 102 of aircraft 104. Aircraft configuration tool 100 may be used by flight crew 106 on aircraft 104 to identify aircraft configuration 108 for operating aircraft 104 in wind shear conditions. Aircraft configuration tool 100 is an example of a wind shear safety performance tool in accordance with an illustrative embodiment.

Aircraft 104 may be a fixed-wing aircraft, a rotary-wing aircraft, a lighter-than-air aircraft, or any other type of aircraft. As another example, aircraft 104 may be an aerospace vehicle that is configured for operation in the air and in space. Aircraft 104 may be a manned or an unmanned aircraft.

Flight deck 102 also may be referred to as the cockpit of aircraft 104. Aircraft controls 110 may be located on flight deck 102. Aircraft controls 110 may include various instruments and control devices or systems that enable flight crew 106 to control the operation of aircraft 104. For example, without limitation, flight deck 102 may include an area located near the front of aircraft 104. In another example, without limitation, flight crew 106 may include a pilot, a co-pilot, a navigator, other personnel, or various combinations of personnel for controlling the operation of aircraft 104.

Flight crew 106 may use aircraft controls 110 to control aircraft configuration 108. Aircraft configuration 108 may be controlled to control aircraft 104 to perform operations 112. Operations 112 also may be referred to as operating states of aircraft 104. For example, without limitation, operations 112 may include takeoff 114, climbing 116, level flight 118, descending 120, landing 122, other operations 124, or combinations of operations.

Aircraft configuration 108 may include, without limitation, speed 126, control surface configuration 128, engine configuration 130, other configuration 132, or combinations of configurations for operating aircraft 104. Speed 126 may include the ground speed or airspeed of aircraft 104. Control surface configuration 128 may include the configurations or operating positions of flaps, ailerons, rudders, or other control surfaces of aircraft 104. Engine configuration 130 may include, for example, without limitation, configurations or operating states of the engines on aircraft 104 that may be controlled to control the thrust provided by the engines or other engine operating parameters. Other configuration 132 may include other aircraft operating parameters, configurations of other aircraft systems, or both.

Aircraft configuration tool 100 may include flight crew interface 134. Flight crew interface 134 may include display device 136 and input device 138. Display device 136 may include any device that may be configured to display a presentation of information to flight crew 106. Input device 138 may include any device that may be configured to allow flight crew 106 to interact with aircraft configuration tool 100, such as by providing information to aircraft configuration tool 100. For example, without limitation, display device 136 and input device 138 may be provided as a number of separate devices or in a single device, such as a touch screen display. In any case, flight crew interface 134 may be provided as part of aircraft configuration tool 100 or by a number of devices that are separate from, but connected to, aircraft configuration tool 100.

Flight crew 106 may use flight crew interface 134 to provide entered information 140 to aircraft configuration tool 100. For example, a graphical user interface may be presented to flight crew 106 on flight crew interface 134 to prompt or otherwise help flight crew 106 to provide entered information 140. For example, without limitation, entered information 140 may include operation identification 142, airport information 144, environmental information 146, and wind shear indication 148. Operation identification 142 may identify one or more of operations 112 to be performed by aircraft 104.

Airport information 144 may include air traffic control information or other information related to an airport at which aircraft 104 will be operated to perform the operation indicated by operation identification 142. For example, without limitation, airport information 144 may include airport runway identification 150. Airport runway identification 150 may identify an airport runway associated with the operation to be performed by aircraft 104. For example, airport runway identification 150 may identify a runway that has been assigned to aircraft 104 for takeoff 114 or landing 122. Environmental information 146 may include information regarding weather or other environmental conditions that may affect the operation of aircraft 104 to perform the operation indicated by operation identification 142.

Wind shear indication 148 is an indication that wind shear conditions may be present that may affect the operation of aircraft 104 to perform the operation indicated by operation identification 142. For example, wind shear indication 148 may be entered by flight crew 106 when flight crew 106 is aware of the presence of wind shear in the area of operation of aircraft 104. Aircraft 104 may be equipped with on-board wind shear detection equipment for notifying flight crew 106 when wind shear conditions are detected in the area of operation of aircraft 104. Off-board equipment and systems also may be used to detect wind shear conditions in the area of operation of aircraft 104. In this case, the detection of wind shear conditions in areas that may affect operation of aircraft 104 may be reported to flight crew 106 onboard aircraft 104 by off-board personnel or automated equipment.

Stored information 160 may include information related to operation of aircraft 104 to perform operations 112 that are stored on aircraft configuration tool 100. Alternatively, some or all of stored information 160 may be stored at another location that may be accessed by aircraft configuration tool 100 to retrieve stored information 160. Stored information 160 may be stored on any number of appropriate data storage devices. For example, without limitation, stored information 160 may include stored airport information 162, manufacturer rules 164, and operator rules 166.

Stored airport information 162 may include stored information related to a number of airports, including the airport at which aircraft 104 will be operated to perform the operation indicated by operation identification 142. Stored airport information 162 may include, without limitation, airport runway information 167, rules for operating aircraft 104 at a number of airports, or other information related to a number of airports. For example, airport runway information 167 may include information identifying various characteristics of a number of runways at a number of airports, including the runway identified by airport runway identification 150. Such runway characteristics may include, for example, the length, orientation, altitude, or other characteristics of the runway. Stored airport information 162 may be provided by airport operator 168.

Manufacturer rules 164 may include rules for operating aircraft 104 to perform operations 112 that may be provided by aircraft manufacturer 170. Aircraft manufacturer 170 may be the manufacturer of aircraft 104. Manufacturer rules 164 may include or take into account performance limitations of aircraft 104. Manufacturer rules 164 may include rules for operating aircraft 104 to perform operations 112 in wind shear conditions.

Operator rules 166 may include rules for operating aircraft 104 to perform operations 112 that may be provided by aircraft operator 172. For example, aircraft operator 172 may be an airline, a military organization, or any other private or government operator of aircraft 104. Operator rules 166 also may be referred to as operating practices. Operator rules 166 may include rules for operating aircraft 104 to perform operations 112 in wind shear conditions.

In general, entered information 140 includes information that may change each time aircraft 104 performs an operation. Stored information 160 includes information that may change less frequently. However, in accordance with illustrative embodiments, portions of entered information 140 as described herein may be provided as stored information 160, portions of stored information 160 as described herein may be provided by flight crew 106 as entered information 140, or both.

Alternatively or in addition, portions of entered information 140 as described herein, portions of stored information 160 as described herein, or both may be provided by aircraft systems 174 on aircraft 104, by off-board systems 176, or by both aircraft systems 174 and off-board systems 176 in any combination.

In accordance with an illustrative embodiment, configuration identifier 178 is configured to identify recommended configuration 180 for operating aircraft 104 to perform the operation indicated by operation identification 142 in wind shear conditions. For example, configuration identifier 178 may be configured to identify recommended configuration 180 in response to wind shear indication 148. Recommended configuration 180 may include recommendations for one or more parts of aircraft configuration 108.

Configuration identifier 178 may be configured to identify recommended configuration 180 using information associated with the operation to be performed by aircraft 104 as indicated by operation identification 142 and rules for operating aircraft 104 in wind shear conditions. The information associated with the operation to be performed by aircraft 104 may include entered information 140, stored information 160, information from aircraft systems 174, information from off-board systems 176, or information from any number of these sources of information in any combination. The rules for operating aircraft 104 in wind shear conditions may include, for example, without limitation, manufacturer rules 164, operator rules 166, or both. Configuration identifier 178 may be configured to identify recommended configuration 180 using any appropriate algorithm or process.

Configuration identifier 178 also may be configured to identify wind shear guidance 182 for operating aircraft 104 in wind shear conditions. Wind shear guidance 182 also may be identified in response to wind shear indication 148. Wind shear guidance 182 may include more general information for operating aircraft 104 to perform the operation indicated by operation identification 142 in wind shear conditions. Configuration identifier 178 may be configured to identify wind shear guidance 182 using any appropriate algorithm or process.

Recommended configuration 180 and wind shear guidance 182 may be provided from configuration identifier 178 to presentation generator 184. Presentation generator 184 may be configured to generate presentation 186 of recommended configuration 180 and wind shear guidance 182. Presentation 186 may be presented to flight crew 106 on display device 136 of flight crew interface 134. Flight crew 106 may utilize the information provided in presentation 186 to plan and execute an operation of aircraft 104 in wind shear conditions.

In accordance with an illustrative embodiment, recommended configuration 180 or portions thereof may be provided from aircraft configuration tool 100 to aircraft systems 174. For example, without limitation, recommended configuration 180 or portions thereof may be provided to other aircraft display systems, electronic checklists, flight management systems, or other aircraft systems or combinations of aircraft systems via, for example, a data bus.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, an aircraft configuration tool in accordance with an illustrative embodiment may be implemented in a system that is not located on an aircraft and may be used to identify a recommended configuration for an aircraft by an operator that is not located on the aircraft.

A wind shear safety performance tool, in accordance with an illustrative embodiment, may be implemented in an airplane system, such as an Onboard Performance Tool (OPT), which is configured to provide aircraft performance solutions to the flight crew. The Onboard Performance Tool may be available as an application on an Electronic Flight Bag. Optionally, the Onboard Performance Tool or components thereof that are configured to provide wind shear safety performance information may be available on another aircraft system.

In an illustrative embodiment where a wind shear safety performance tool is implemented on an Electronic Flight Bag, the wind shear safety performance tool may be communicatively connected to a number of aircraft systems, such as the communication system, navigation system, and the aircraft control system. The connections may be similar to the generalized architecture of aircraft systems disclosed in, for example, U.S. patent application Ser. No. 13/176,567 entitled "Methods and Systems for Landing Decision Point", which is incorporated herein in its entirety by reference.

In this regard, the tool may be enabled to receive airport configuration information, such as an airport surface map, airport weather information, and airplane performance information from one or more aircraft systems. The tool or another aircraft system may also be enabled to store airline operational practices, such as selection or setting of takeoff runways, thrust settings, flap settings, or other normal and/or non-normal procedures for certain operating conditions. The tool may also be configured to apply the operational practices to the airplane performance information, airport configuration, and airport weather information to determine customized takeoff guidance information tailored to address expected or potential wind shear conditions. The customized takeoff guidance information may include the airplane's takeoff configuration, such as thrust settings, flap settings, and takeoff rotation speed, as well as other takeoff and/or climb-related procedural information. The tool may store the customized takeoff guidance information and make it available for display at one or more flight deck displays.

A wind shear safety performance tool in accordance with an illustrative embodiment may provide configuration information for the flight crew including, for example, parameters, such as flap settings, runway selection, and takeoff rotation speed consistent with the operational practices of the airline operator. With respect to the implementation of the operational practices of the airline operator, the configuration of the tool may begin at the airline "back office", where a subject matter expert using an on-ground administration tool (hereafter called the ground administration tool), is able to activate the wind shear option of the onboard tool. Optionally, in another embodiment, the wind shear option may also be activated onboard the airplane.

Next, the tool is configured with wind shear guidance information consistent with the specific operational practices of the airline or other operator, including, for example, operational practices for a particular airport or a particular runway at a particular airport. This guidance information will generally include airplane performance information related to thrust selection, flap selection, rotation speed, and guidance on handling of actual wind shear encounter. Lastly, the flight crew is provided with customized takeoff guidance information, including takeoff configuration information, for the expected or potential wind shear conditions that are consistent with said operational practices.

In one distinct embodiment of the on-ground administration tool, the tool may retrieve airplane performance data from one or more databases or storage devices. The tool may further retrieve operational practices or policies of the airline from one or more databases or storage devices. The tool may then apply the operational practices of the airline to the airplane performance data to generate customized takeoff guidance information. In other distinct embodiments, wind shear guidance information may be configured to be provided as a first level menu button of a takeoff performance page or another page of the Onboard Performance Tool.

Figure 2:
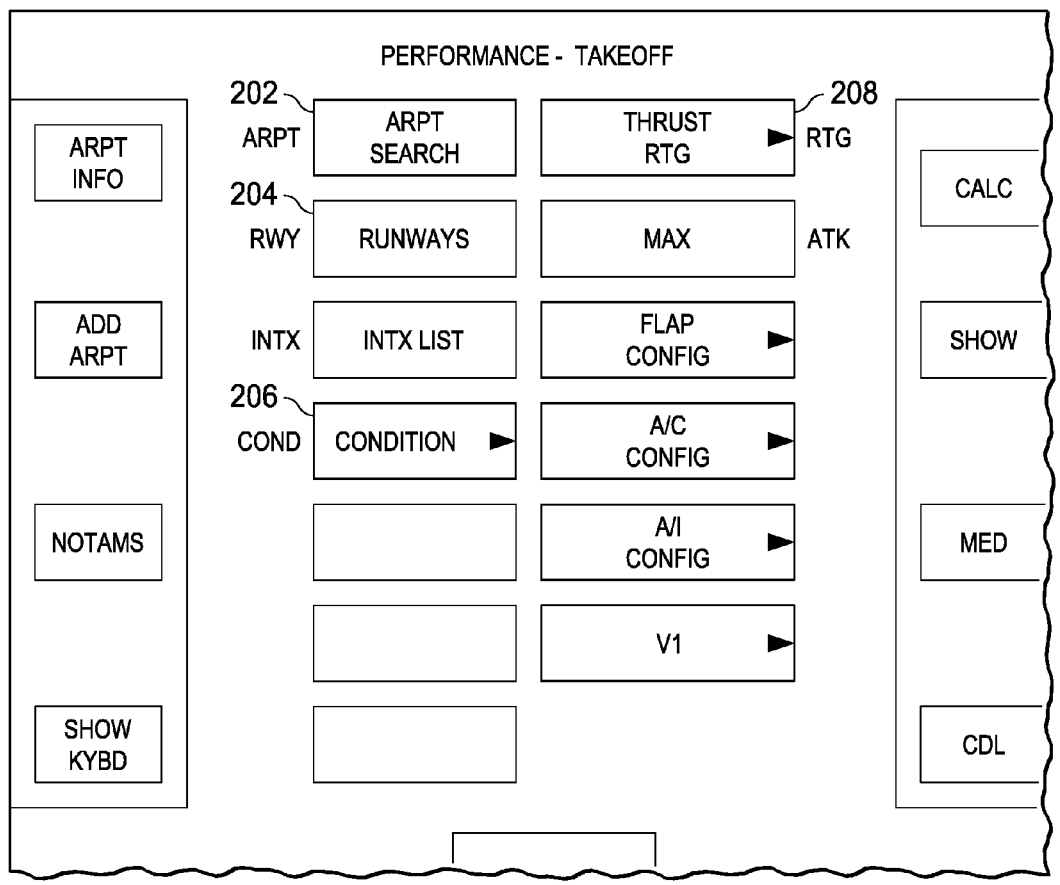
FIG. 2 is an illustration of a user interface showing takeoff performance menu options in accordance with an illustrative embodiment.

Turning now to FIG. 2, an illustration of a user interface showing takeoff performance menu options is illustrated in accordance with an illustrative embodiment. In this example, user interface 200 is an example of one implementation of a user interface for aircraft configuration tool 100 that may be presented to flight crew 106 on flight crew interface 134 in FIG. 1. For example, user interface 200 may be presented to a flight crew operating an airport configuration tool in accordance with an illustrative embodiment to identify an aircraft configuration for performing a takeoff operation.

In this example, user interface 200 includes a number of virtual buttons that may be selected by the flight crew to access or enter information associated with the takeoff operation to be performed. For example, the flight crew may select ARPT button 202 to search a list of airports and to identify the airport from which the aircraft will take off. The flight crew may then select RWY button 204 to identify the specific runway at the selected airport that has been assigned to the aircraft for takeoff. COND button 206 may be selected to identify current conditions that may affect the takeoff.

User interface 200 also includes a number of virtual buttons corresponding to various parts of the aircraft configuration for which a recommended configuration may be identified. For example, the flight crew may select RTG button 208 to identify recommended thrust ratings to be used for the takeoff.

Figure 3:
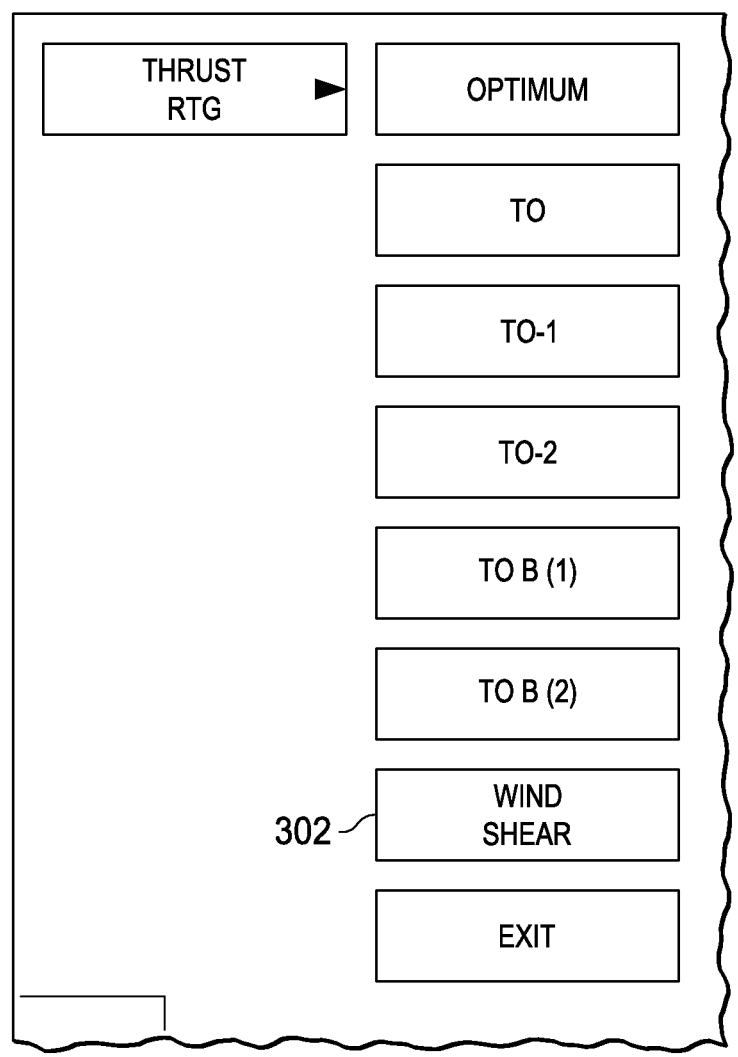
FIG. 3 is an illustration of a user interface showing a wind shear indication option in accordance with an illustrative embodiment.

Turning now to FIG. 3, an illustration of a user interface showing a wind shear indication option is depicted in accordance with an illustrative embodiment. In this example, user interface 300 is an example of another user interface for aircraft configuration tool 100 that may be presented to flight crew 106 on flight crew interface 134 in FIG. 1. In this example, user interface 300 may be presented in response to selecting RTG button 208 in FIG. 2.

In this example, user interface 300 includes virtual button 302 that may be selected by the flight crew to indicate that there are wind shear conditions in the area of aircraft operations. For example, virtual button 302 may be selected to identify a recommended aircraft configuration for performing the takeoff operation in wind shear conditions.

Turning now to FIG. 4, an illustration of a presentation of guidance information for wind shear is depicted in accordance with an illustrative embodiment. In this example, presentation 400 is an example of presentation 186 of wind shear guidance 182 that may be presented to flight crew 106 on display device 136 of aircraft configuration tool 100 in FIG. 1.

In this example, guidance information 401 includes information for performing a takeoff operation in wind shear conditions. The flight crew may acknowledge reviewing guidance information 401 by selecting button 402. In accordance with an illustrative embodiment, presentation 400 may continue to be displayed until button 402 is selected.

Turning now to FIG. 5, an illustration of a presentation of a recommended takeoff configuration for an aircraft when wind shear is indicated is depicted in accordance with an illustrative embodiment. In this example, presentation 500 is an example of a portion of presentation 186 of recommended configuration 180 that may be presented to flight crew 106 on display device 136 of aircraft configuration tool 100 in FIG. 1.

In this example, presentation 500 includes indication 502 that provides a recommended rotation speed for takeoff of the aircraft in wind shear conditions. The rotation speed is the speed of the aircraft at which the aircraft is controlled to lift the front landing gear of the aircraft off the ground as the aircraft pivots around the axis of its main landing gear.

Figure 6:
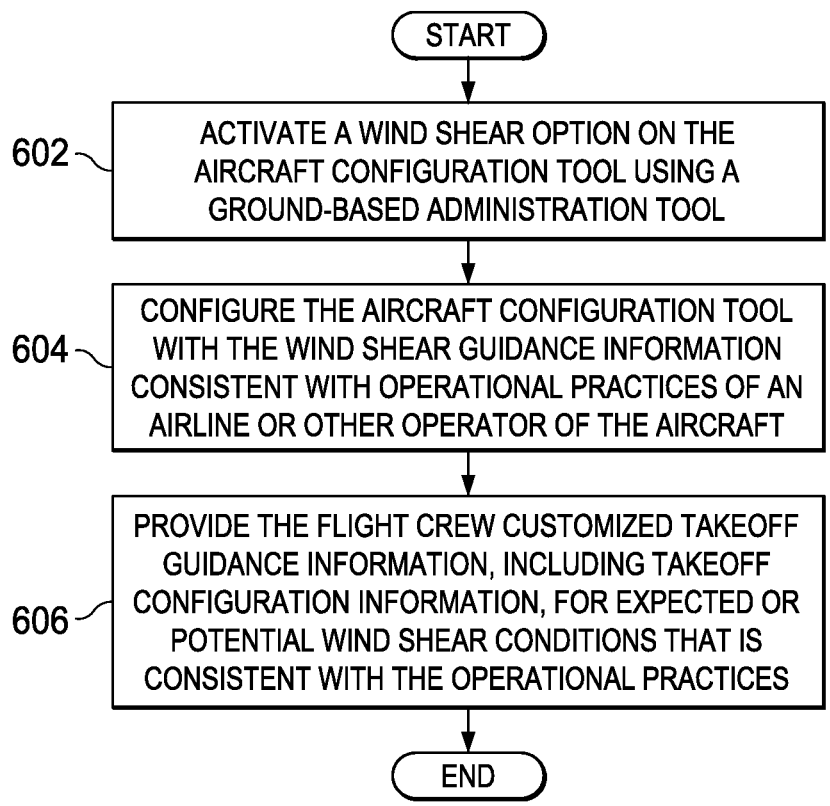
FIG. 6 is an illustration of a flowchart of a process for implementing a wind shear safety performance tool in accordance with an illustrative embodiment.

Turning now to FIG. 6, an illustration of a flowchart of a process for implementing a wind shear safety performance tool is depicted in accordance with an illustrative embodiment. In this example, the process of FIG. 6 is an example of a process for implementing and using aircraft configuration tool 100 in FIG. 1.

The process may begin by activating a wind shear option on the aircraft configuration tool using a ground-based administration tool (operation 602). The aircraft configuration tool may be configured with wind shear guidance information consistent with operational practices of an airline or other operator of the aircraft (operation 604). The aircraft configuration tool then may be used by a flight crew to provide customized takeoff guidance information, including takeoff configuration information for expected or potential wind shear conditions that is consistent with the operational practices (operation 606), with the process terminating thereafter.

Figure 7:
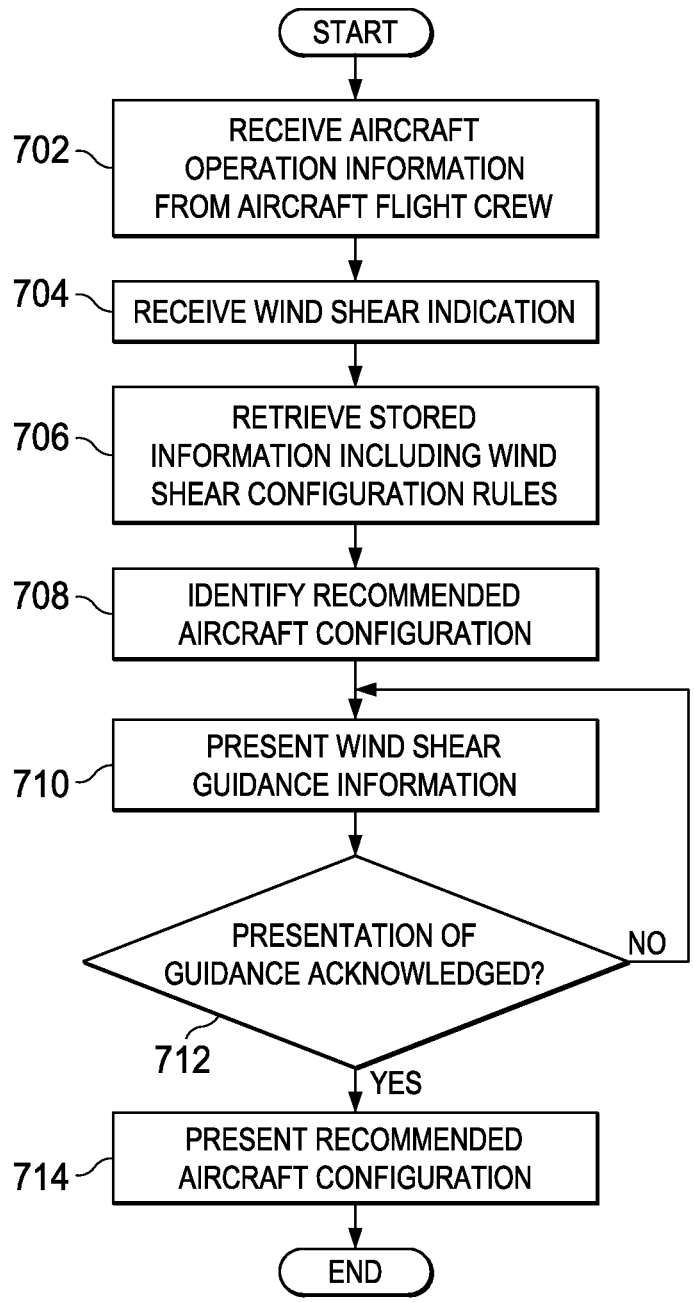
FIG. 7 is an illustration of a flowchart of a process for operation of a wind shear safety performance tool in accordance with an illustrative embodiment.

Turning now to FIG. 7, an illustration of a flowchart of a process for operation of a wind shear safety performance tool is depicted in accordance with an illustrative embodiment. In this example, the process of FIG. 7 may be implemented in aircraft configuration tool 100 in FIG. 1.

The process may begin by receiving information associated with an operation to be performed by an aircraft from the aircraft flight crew (operation 702). The information received from the flight crew may include an operation identification for identifying the operation to be performed by the aircraft. A wind shear indication may then be received (operation 704). The wind shear indication may indicate the presence of wind shear conditions in the area of aircraft operations. Stored information including rules for operating the aircraft in wind shear conditions may be retrieved (operation 706).

A recommended aircraft configuration for operating the aircraft in wind shear conditions may be identified (operation 708). The recommended aircraft configuration may be identified using the information associated with the operation to be performed by the aircraft and the rules for operating the aircraft in wind shear conditions.

Wind shear guidance information may then be presented to the flight crew (operation 710). It may be determined whether the presentation of the wind shear guidance information is acknowledged (operation 712). The wind shear guidance information may continue to be presented at operation 710 until it is determined that the presentation of the wind shear guidance information is acknowledged at operation 712. If the presentation of the wind shear guidance information is acknowledged, the recommended aircraft configuration may be presented to the flight crew (operation 714), with the process terminating thereafter. If the presentation of the wind shear guidance information is not acknowledged, the process returns to operation 710 as described above.

Figure 8:
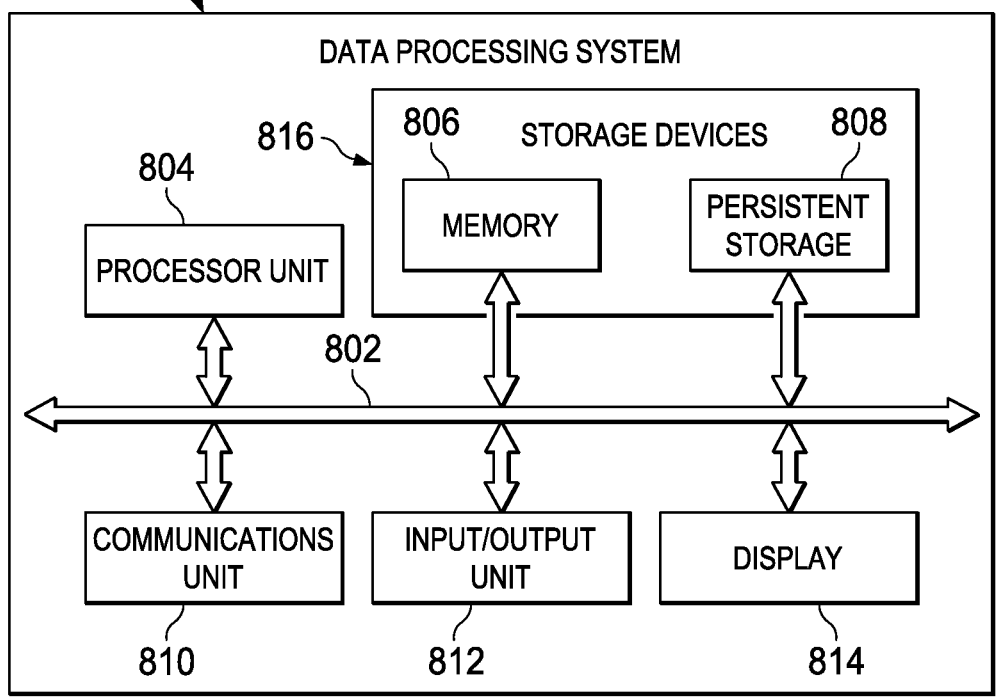
FIG. 8 is an illustration of a data processing system in accordance with an illustrative embodiment.

Turning now to FIG. 8, an illustration of a data processing system is depicted in accordance with an illustrative embodiment. In this example, data processing system 800 is an example of one implementation of a data processing system in which aircraft configuration tool 100 in FIG. 1 may be implemented. In this illustrative example, data processing system 800 includes communications fabric 802. Communications fabric 802 provides communications between processor unit 804, memory 806, persistent storage 808, communications unit 810, input/output (I/O) unit 812, and display 814. Memory 806, persistent storage 808, communications unit 810, input/output (I/O) unit 812, and display 814 are examples of resources accessible by processor unit 804 via communications fabric 802.

Processor unit 804 serves to run instructions for software that may be loaded into memory 806. Processor unit 804 may be a number of processors, a multi-processor core, or some other type of processor, depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, data processing system 800 may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or transmit and receive data. Communications unit 810 may be, for example, a modem or a network adapter, two network adapters, or some combination thereof. Further, a memory may be, for example, memory 806, or a cache, such as found in an interface and memory controller hub that may be present in communications fabric 802.

The flowcharts and block diagrams in the figures illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for overcoming a lack of awareness and inaccurate response to a condition indicating a potential for a wind shear, by a flight crew in an aircraft, prior to a takeoff of the aircraft near an area comprising the condition indicating the potential for the wind shear, the method comprising:
   specifically programming a ground administration tool for determining the condition indicating the potential for the wind shear near the area and customizing: a thrust setting, a flap setting, a runway selection and a takeoff rotation speed, tailored for addressing the condition;
   receiving, by the ground administration tool, information associated with the takeoff to be performed by the aircraft;
   receiving, by the ground administration tool, an indication comprising the potential for the condition near the area during the takeoff; and
   responsive to receiving the indication, the ground administration tool activating a wind shear option in an aircraft configuration tool onboard the aircraft, the aircraft configuration tool comprising a configuration identifier that generates;
       guidance for operating the aircraft, performing an operation indicated by an operation identification, in the wind shear, such that the guidance for operating the aircraft is customized for the condition; and
       a recommended configuration comprising a customized: thrust setting, flap setting, runway selection, and takeoff rotation speed, tailored for addressing the condition;
   providing the recommended configuration to an aircraft system;
   displaying, in a textual format, the guidance on a display device visible to the flight crew;
   withholding displaying the recommended configuration on the display visible to the flight crew until receiving an acknowledgment, of displaying the guidance, from a flight crew interface; and
   displaying the recommended configuration after receiving the acknowledgment of displaying the guidance.

2. The method of claim 1, further comprising the aircraft system comprising an electronic checklist, and wherein receiving the information associated with the takeoff to be performed by the aircraft comprises receiving the information associated with the takeoff to be performed by the aircraft from the flight crew of the aircraft via a flight crew graphical user interface presented by the display device and comprised in the user interface presented by the display device;
   wherein the indication comprises another indication that wind shear conditions may affect the takeoff to be performed by the aircraft;
   further comprising receiving the indication that the wind shear conditions may affect the takeoff via the flight crew graphical user interface; and
   further comprising presenting the recommended configuration for the aircraft to perform the takeoff in the wind shear conditions via the flight crew graphical user interface.

3. The method of claim 2, wherein receiving the information associated with the takeoff to be performed by the aircraft comprises retrieving, by a processor unit, a portion of the information associated with the takeoff to be performed by the aircraft from a storage device on the aircraft.

4. The method of claim 1, wherein the information associated with the takeoff to be performed by the aircraft is received on the display device and comprises airport runway information and environmental information, wherein the airport runway information comprises an airport runway identification identifying an airport runway associated with the takeoff to be performed by the aircraft.

5. The method of claim 4, further comprising retrieving, by a processor unit, rules for operating the aircraft in wind shear conditions from a storage device on the aircraft; and
   wherein the runway information comprises runway characteristics selected from the group consisting of a runway length, a runway orientation, and a runway altitude.

6. The method of claim 1, wherein the recommended configuration for the aircraft to perform the takeoff in wind shear conditions comprises a recommended takeoff rotation speed for the aircraft to address the wind shear conditions, wherein the takeoff rotation speed is the speed of the aircraft at which the aircraft is configured to lift a first landing gear off a ground as the aircraft is pivoted around an axis of a second landing gear.

7. The method of claim 1 further comprising:
   presenting the recommended configuration for the aircraft to perform the takeoff in wind shear conditions to the flight crew on a graphical user interface presented by the display device; and
   performing the takeoff in the wind shear conditions by utilizing the recommended configuration for the aircraft to perform the takeoff in the wind shear conditions.

8. An apparatus that overcomes a lack of awareness and inaccurate response to a condition indicating a potential for a wind shear, by a flight crew in an aircraft, prior to a takeoff of the aircraft near an area comprising the condition indicating the potential for the wind shear, the apparatus comprising:
   a configuration identifier that receives information associated with at least one of:
       a takeoff, and a landing, to be performed by the aircraft; and
       an indication of a wind shear condition during the at least one of: the takeoff, and the landing, and
   activates a wind shear option in the configuration identifier that identifies, responsive to receiving the indication that the wind shear may be present during the at least one of: the takeoff, and the landing;
   guidance for operating the aircraft with the wind shear condition, the guidance for operating the aircraft being customized for the condition; and
   a recommended configuration for the aircraft to perform the at least one: of the takeoff, and the landing, in the wind shear using the information associated with the at least one of:
       the takeoff, and the landing, to be performed by the aircraft;
       and rules for operating the aircraft in wind shear conditions such that the recommended configuration comprises a recommended: speed, configuration of a flap, and configuration of the operation of an engine; and provides the recommended configuration to an electronic checklist; and a display device for:

presenting, visible to the flight crew, the indication of the wind shear condition;

presenting in a textual format, visible to the flight crew, the guidance for operating the aircraft with the wind shear condition; and after the configuration identifier receives an acknowledgement, of a presentation of the guidance, from a flight crew interface, presenting, visible to the flight crew, the recommended configuration for the aircraft to perform the at least one of: the takeoff, and the landing, in the wind shear.

9. The apparatus of claim 8, wherein the display device comprises a graphical user interface for the configuration identifier and further comprising a flight crew interface coupled to the graphical user interface for the configuration identifier, wherein the graphical user interface for the configuration identifier is presented by the display device and configured to receive the information associated with the at least one of the takeoff and the landing to be performed by the aircraft.

10. The apparatus of claim 9 further comprising a storage device on the aircraft coupled to the configuration identifier, and wherein the configuration identifier is configured to retrieve a portion of the information associated with the at least one of the takeoff and the landing to be performed by the aircraft from the storage device.

11. The apparatus of claim 9, wherein the information associated with the at least one of the takeoff and the landing to be performed by the aircraft comprises airport runway information and environmental information, wherein the airport runway information comprises an airport runway identification identifying an airport runway associated with the at least one of the takeoff and the landing to be performed by the aircraft.

12. The apparatus of claim 11, wherein the at least one of the takeoff and the landing to be performed by the aircraft comprises the takeoff, wherein the takeoff is in the wind shear.

13. The apparatus of claim 12 further comprising a storage device on the aircraft coupled to the configuration identifier, and wherein the configuration identifier is retrieves the rules for operating the aircraft in the wind shear conditions from the storage device.

14. The apparatus of claim 13, wherein the recommended configuration for the aircraft to perform the takeoff in the wind shear further comprises a recommended takeoff rotation speed for the aircraft and a recommended aerodynamic control surface configuration for the aircraft, wherein the recommended takeoff rotation speed and the recommended aerodynamic control surface configuration are both configured to reduce a threat posed by the wind shear.

15. The apparatus of claim 14 further comprising a presentation generator coupled to the configuration identifier and configured to generate a presentation of the recommended configuration for the aircraft to perform the takeoff in the wind shear comprising the recommended takeoff rotation speed and the recommended aerodynamic control surface configuration, wherein the presentation is to the flight crew and is on the graphical user interface for the configuration identifier and wherein the recommended aerodynamic control surface configuration is selected from the group consisting of a first configuration of the flap, a second configuration of an aileron, and a third configuration of a rudder.

16. The apparatus of claim 15, wherein:

the aircraft is selected from the group consisting of a rotary-wing aircraft, a lighter-than air aircraft, and an aerospace vehicle configured for operation in air and operation in space; and the configuration identifier is configured to identify, responsive to the indication that the wind shear may be present during the at least one of the takeoff and the landing, wind shear guidance comprising information, different from the recommended configuration for the aircraft, for performing the at least one of the takeoff in the wind shear and the landing in the wind shear.

17. A method for overcoming a lack of awareness and inaccurate response to a condition indicating a potential for a wind shear, by a flight crew in an aircraft, prior to a takeoff of the aircraft near an area comprising the condition indicating the potential for the wind shear, the method comprising:

storing, in a storage device, rules for the aircraft performing the operation in the condition, and selecting the operation from the group consisting of: taking off, climbing, flying level, and landing, in the condition;

receiving at a ground administration tool:

information associated with the aircraft performing at least one of taking off, climbing, flying level, descending, and landing; and an indication that the wind shear may be present during the aircraft performing the at least one of the taking off, the climbing, the flying level, the descending, and the landing;

retrieving from the storage device, using the ground administration tool, responsive to receiving the indication that the wind shear may be present during the aircraft performing the at least one of the taking off, the climbing, the flying level, the descending, and the landing, the rules for the aircraft to perform the operation in the condition;

activating, using the ground administration tool, a wind shear option in an aircraft configuration tool onboard the aircraft, the aircraft configuration tool comprising a configuration identifier that generates;

a recommended configuration comprising a recommended: speed, configuration of a flap, and configuration of the operation of an engine, for the aircraft performing the operation in the condition using the information associated with the aircraft performing the at least one of the taking off, the climbing, the flying level, the descending, and the landing and the rules for the aircraft to perform the operation in the condition; and guidance for operating the aircraft, performing an operation indicated by an operation identification, in the wind shear, such that the guidance for operating the aircraft is customized for the condition;

providing the recommended configuration to an electronic checklist; and presenting, on a display device visible to the flight crew, in a textual format, the guidance for operating the aircraft, performing the operation indicated by the operation identification, in the wind shear the indication that the wind shear may be present during the aircraft performing the at least one of the taking off, the climbing, the flying level, the descending, and the landing; and withholding presenting the recommended configuration until receiving an acknowledgment, of displaying the guidance, from a flight crew interface; and presenting, after receiving the acknowledgment of presenting the guidance for operating the aircraft, performing the operation indicated by the operation identification, in the wind shear, the recommended configuration for the aircraft performing the operation in the condition.

18. The method of claim 17, wherein the rules for the aircraft to perform the operation in the condition selected from the group consisting of the: taking off, climbing, flying level, descending, and landing in the condition are selected from manufacturer rules provided by an aircraft manufacturer and operator rules provided by an aircraft operator.

19. The method of claim 17 further comprising:
storing airport information in the storage device;
the ground administration tool receiving an airport runway identification identifying an airport runway associated with the aircraft the at least one of the taking off and the landing, and retrieving airport runway information for the airport runway associated with the aircraft the at least one of the taking off and the landing from the airport information stored in the storage device, and identifying the recommended configuration for the aircraft to perform the operation in the condition selected from the group consisting of the: taking off, and landing in the condition using the airport runway information.

20. The method of claim 19,
further comprising placing the storage device and a data processing system on a flight deck on the aircraft after storing the rules for the aircraft to perform the operation in the condition selected from the group consisting of the: taking off, climbing, flying level, descending, and landing in the condition in the storage device and configuring the data processing system; and wherein the airport information comprises an airport surface map and airport weather information.

* * * * *